(12) United States Patent
Smith et al.

(10) Patent No.: US 7,519,654 B1
(45) Date of Patent: Apr. 14, 2009

(54) WEB GATEWAY MULTI-CARRIER SUPPORT

(75) Inventors: Richard A. Smith, Anne Arundel, MD (US); Nikhil Bhadange, Anne Arundel, MD (US)

(73) Assignee: TeleCommunication Systems, Inc., Annapolis, MD (US)

( * ) Notice: Subject to any disclaimer, the term of this patent is extended or adjusted under 35 U.S.C. 154(b) by 338 days.

(21) Appl. No.: 09/716,944

(22) Filed: Nov. 22, 2000

(51) Int. Cl.
*G06F 15/16* (2006.01)
*H04W 4/00* (2006.01)

(52) U.S. Cl. .................................. 709/203; 455/466

(58) Field of Classification Search ................ 709/203, 709/204, 205, 206–207, 217–219, 229–230; 455/412.1, 414.3, 432.2, 466, 432, 445, 412
See application file for complete search history.

(56) References Cited

U.S. PATENT DOCUMENTS

| | | | |
|---|---|---|---|
| 1,103,073 A | 7/1914 | O'Connel |
| 4,494,119 A | 1/1985 | Wimbush |
| 4,651,156 A | 3/1987 | Martinez |
| 4,706,275 A | 11/1987 | Kamil |
| 4,891,638 A | 1/1990 | Davis |
| 4,891,650 A | 1/1990 | Sheffer |
| 4,952,928 A | 8/1990 | Carroll et al. |
| 5,014,206 A | 5/1991 | Scribner et al. |
| 5,043,736 A | 8/1991 | Darnell et al. |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Drori et al. |
| 5,119,104 A | 6/1992 | Heller |
| 5,144,283 A | 9/1992 | Arens et al. |
| 5,161,180 A | 11/1992 | Chavous |
| 5,177,478 A | 1/1993 | Wagai et al. |
| 5,193,215 A | 3/1993 | Olmer |
| 5,208,756 A | 5/1993 | Song |
| 5,214,789 A | 5/1993 | George |
| 5,218,367 A | 6/1993 | Sheffer et al. |
| 5,223,844 A | 6/1993 | Mansell et al. |
| 5,235,630 A | 8/1993 | Moodey et al. |
| 5,239,570 A | 8/1993 | Koster et al. |
| 5,243,645 A | 9/1993 | Bissel et al. |
| 5,266,944 A | 11/1993 | Carrol et al. |
| 5,289,527 A | 2/1994 | Tiedemann, Jr. |
| 5,293,642 A | 3/1994 | Lo |
| 5,299,132 A | 3/1994 | Wortham |
| 5,325,302 A | 6/1994 | Izidon et al. |

(Continued)

*Primary Examiner*—Yasin M Barqadle
(74) *Attorney, Agent, or Firm*—William H. Bollman

(57) ABSTRACT

The present invention provides multi-carrier support in a wireless Internet gateway (WIG) that allows the WIG to send messages to any number of 'peer' gateways on the Internet in a conveniently reconfigurable manner. The disclosed embodiments include a 'Message Distribution Center' (MDC), through which short messages can be routed to the gateways of other wireless carriers based on carrier formats stored in an abstracted carrier format table. The conventional technique of separate classes written for each carrier is replaced by entries in a look-up table format, to provide a more easily adaptable wireless gateway. Thus, occasional updates of the carrier format table need only be updated, rather than the wireless Internet gateway program, reducing down time for updates, reducing the complexity of updates, and improving the reliability of a wireless Internet gateway in the face of changes for one or more carriers in a wireless network.

11 Claims, 7 Drawing Sheets

U.S. PATENT DOCUMENTS

| | | | |
|---|---|---|---|
| 5,334,974 A | 8/1994 | Simms et al. | |
| 5,343,493 A | 8/1994 | Karimullah | |
| 5,347,568 A | 9/1994 | Moody et al. | |
| 5,351,235 A | 9/1994 | Lahtinen | |
| 5,361,212 A | 11/1994 | Class et al. | |
| 5,363,425 A | 11/1994 | Mufti et al. | |
| 5,374,936 A | 12/1994 | Feng | |
| 5,379,451 A | 1/1995 | Nakagoshi et al. | |
| 5,381,338 A | 1/1995 | Wysocki et al. | |
| 5,387,993 A | 2/1995 | Heller et al. | |
| 5,388,147 A | 2/1995 | Grimes | |
| 5,390,339 A | 2/1995 | Bruckert et al. | |
| 5,394,158 A | 2/1995 | Chia | |
| 5,396,227 A | 3/1995 | Carroll et al. | |
| 5,398,190 A | 3/1995 | Wortham | |
| 5,406,614 A | 4/1995 | Hara | |
| 5,418,537 A | 5/1995 | Bird | |
| 5,423,076 A | 6/1995 | Westergreen et al. | |
| 5,432,841 A | 7/1995 | Rimer | |
| 5,434,789 A | 7/1995 | Fraker et al. | |
| 5,454,024 A | 9/1995 | Lebowitz | |
| 5,461,390 A | 10/1995 | Hoshen | |
| 5,470,233 A | 11/1995 | Fuchterman et al. | |
| 5,479,408 A | 12/1995 | Will | |
| 5,479,482 A | 12/1995 | Grimes | |
| 5,485,161 A | 1/1996 | Vaughn | |
| 5,485,163 A | 1/1996 | Singer et al. | |
| 5,488,563 A | 1/1996 | Chazelle et al. | |
| 5,497,149 A | 3/1996 | Fast | |
| 5,508,931 A | 4/1996 | Snider | |
| 5,513,243 A | 4/1996 | Kage | |
| 5,515,287 A | 5/1996 | Hakoyama et al. | |
| 5,519,403 A | 5/1996 | Bickley et al. | |
| 5,532,690 A | 7/1996 | Hertel | |
| 5,535,434 A | 7/1996 | Siddoway et al. | |
| 5,539,398 A | 7/1996 | Hall et al. | |
| 5,543,776 A | 8/1996 | L'esperance et al. | |
| 5,552,772 A | 9/1996 | Janky et al. | |
| 5,555,286 A | 9/1996 | Tendler | |
| 5,568,119 A | 10/1996 | Schipper et al. | |
| 5,574,648 A | 11/1996 | Pilley | |
| 5,579,372 A | 11/1996 | Astrom | |
| 5,588,009 A | 12/1996 | Will | |
| 5,592,535 A | 1/1997 | Klotz | |
| 5,604,486 A | 2/1997 | Lauro et al. | |
| 5,606,313 A | 2/1997 | Allen et al. | |
| 5,606,850 A | 3/1997 | Nakamura | |
| 5,610,815 A | 3/1997 | Gudat et al. | |
| 5,614,890 A | 3/1997 | Fox | |
| 5,615,116 A | 3/1997 | Gudat et al. | |
| 5,621,793 A | 4/1997 | Bednarak et al. | |
| 5,633,912 A | 5/1997 | Tsoi | |
| 5,673,306 A | 9/1997 | Amadon et al. | |
| 5,692,037 A | 11/1997 | Friend | |
| 5,694,546 A | 12/1997 | Reisman | |
| 5,740,534 A | 4/1998 | Ayerst et al. | |
| 5,758,088 A * | 5/1998 | Bezaire et al. | 709/232 |
| 5,761,618 A | 6/1998 | Lynch et al. | |
| 5,768,509 A | 6/1998 | Gunluk | |
| 5,794,142 A | 8/1998 | Vanttila et al. | |
| 5,797,091 A | 8/1998 | Clise et al. | |
| 5,797,094 A | 8/1998 | Houde et al. | |
| 5,797,096 A | 8/1998 | Lupien et al. | |
| 5,802,492 A | 9/1998 | DeLorme et al. | |
| 5,806,000 A | 9/1998 | Vo et al. | |
| 5,822,700 A | 10/1998 | Hult et al. | |
| 5,828,740 A | 10/1998 | Khuc et al. | |
| 5,903,726 A * | 5/1999 | Donovan et al. | 709/206 |
| 5,930,701 A | 7/1999 | Skog | |
| 5,940,756 A | 8/1999 | Sibecas et al. | |
| 5,943,399 A | 8/1999 | Bannister et al. | |
| 5,946,630 A | 8/1999 | Willars et al. | |
| 5,949,326 A | 9/1999 | Wicks et al. | |
| 5,950,130 A | 9/1999 | Coursey | |
| 5,953,398 A | 9/1999 | Hill | |
| 5,959,543 A | 9/1999 | LaPorta et al. | |
| 5,960,074 A | 9/1999 | Clark | |
| 5,966,663 A | 10/1999 | Gleason | |
| 5,974,054 A | 10/1999 | Couts et al. | |
| 5,978,685 A | 11/1999 | Laiho | |
| 5,987,323 A | 11/1999 | Huotari | |
| 5,999,811 A | 12/1999 | Molne | |
| 6,021,333 A | 2/2000 | Anderson | |
| 6,035,025 A | 3/2000 | Hanson | |
| 6,058,300 A | 5/2000 | Hanson | |
| 6,064,875 A | 5/2000 | Morgan | |
| 6,075,982 A | 6/2000 | Donovan et al. | |
| 6,078,583 A | 6/2000 | Takahara | |
| 6,081,508 A | 6/2000 | West et al. | |
| 6,094,574 A | 7/2000 | Vance et al. | |
| 6,101,378 A | 8/2000 | Barabash et al. | |
| 6,122,503 A | 9/2000 | Daly | |
| 6,122,520 A | 9/2000 | Want et al. | |
| 6,134,432 A | 10/2000 | Holmes et al. | |
| 6,138,158 A | 10/2000 | Boyle et al. | |
| 6,144,653 A | 11/2000 | Persson et al. | |
| 6,148,197 A | 11/2000 | Bridges et al. | |
| 6,148,198 A | 11/2000 | Anderson et al. | |
| 6,169,891 B1 | 1/2001 | Gorham et al. | |
| 6,173,181 B1 | 1/2001 | Losh | |
| 6,178,331 B1 | 1/2001 | Holmes et al. | |
| 6,181,935 B1 | 1/2001 | Gossman et al. | |
| 6,185,602 B1 | 2/2001 | Bayrakeri | |
| 6,188,752 B1 | 2/2001 | Lesley | |
| 6,189,031 B1 | 2/2001 | Badger et al. | |
| 6,195,651 B1 | 2/2001 | Handel et al. | |
| 6,198,431 B1 | 3/2001 | Gibson | |
| 6,199,045 B1 | 3/2001 | Giniger et al. | |
| 6,205,330 B1 | 3/2001 | Winbladh | |
| 6,208,870 B1 | 3/2001 | Lorello | |
| 6,216,008 B1 | 4/2001 | Lee | |
| 6,223,042 B1 | 4/2001 | Raffel | |
| 6,223,046 B1 | 4/2001 | Hamill-Keays et al. | |
| 6,226,529 B1 | 5/2001 | Bruno et al. | |
| 6,246,879 B1 * | 6/2001 | Segura et al. | 455/446 |
| 6,249,680 B1 | 6/2001 | Wax et al. | |
| 6,263,212 B1 * | 7/2001 | Ross et al. | 455/466 |
| 6,263,372 B1 * | 7/2001 | Hogan et al. | 709/237 |
| 6,266,614 B1 | 7/2001 | Alumbaugh | |
| 6,289,373 B1 | 9/2001 | Dezonno | |
| 6,304,898 B1 | 10/2001 | Shinigi | |
| 6,311,055 B1 | 10/2001 | Boltz et al. | |
| 6,314,108 B1 | 11/2001 | Ramasubramani et al. | |
| 6,317,594 B1 | 11/2001 | Gossman et al. | |
| 6,321,257 B1 | 11/2001 | Kotola et al. | |
| 6,327,479 B1 | 12/2001 | Mikkola | |
| 6,330,600 B1 * | 12/2001 | Matchefts et al. | 709/223 |
| 6,353,614 B1 | 3/2002 | Borella et al. | |
| 6,366,663 B1 | 4/2002 | Bauer et al. | |
| 6,366,961 B1 * | 4/2002 | Subbiah et al. | 709/238 |
| 6,370,373 B1 | 4/2002 | Gerth et al. | |
| 6,389,421 B1 | 5/2002 | Hawkins et al. | |
| 6,389,455 B1 | 5/2002 | Fuisz | |
| 6,393,014 B1 | 5/2002 | Daly | |
| 6,393,461 B1 | 5/2002 | Okada | |
| 6,397,054 B1 | 5/2002 | Hoirup et al. | |
| 6,408,177 B1 | 6/2002 | Parikh et al. | |
| 6,424,841 B1 * | 7/2002 | Gustafsson | 455/466 |
| 6,442,589 B1 | 8/2002 | Takahashi et al. | |
| 6,459,892 B2 | 10/2002 | Burgan | |
| 6,463,145 B1 * | 10/2002 | O'Neal et al. | 379/211.02 |
| 6,493,558 B1 | 12/2002 | Bernhart et al. | |
| 6,499,053 B1 | 12/2002 | Marquette et al. | |
| 6,502,086 B2 | 12/2002 | Katariya | |

| | | |
|---|---|---|
| 6,505,046 B1 | 1/2003 | Baker |
| 6,507,589 B1 * | 1/2003 | Ramasubramani et al. .. 370/465 |
| 6,512,930 B2 | 1/2003 | Sandegren |
| 6,538,561 B2 * | 3/2003 | Angus ........................ 340/7.21 |
| 6,560,456 B1 * | 5/2003 | Lohtia et al. ................. 455/445 |
| 6,560,546 B1 | 5/2003 | Lohita et al. |
| 6,564,261 B1 | 5/2003 | Gudjonsson et al. |
| 6,587,691 B1 | 7/2003 | Granstam et al. |
| 6,591,304 B1 | 7/2003 | Sitaraman et al. |
| 6,654,786 B1 | 11/2003 | Fox et al. |
| 6,662,015 B2 | 12/2003 | Furlong |
| 6,667,688 B1 | 12/2003 | Menard et al. |
| 6,671,356 B2 | 12/2003 | Lewis |
| 6,674,767 B1 * | 1/2004 | Kadyk et al. ................. 370/466 |
| 6,711,411 B1 * | 3/2004 | Ruffini ........................ 455/502 |
| 6,718,178 B1 | 4/2004 | Sladek et al. |
| 6,725,268 B1 | 4/2004 | Jackel et al. |
| 6,757,708 B1 | 6/2004 | Craig et al. |
| 6,771,971 B2 | 8/2004 | Smith |
| 6,779,022 B1 | 8/2004 | Horstmann et al. |
| 6,785,659 B1 | 8/2004 | Landsman et al. |
| 6,856,804 B1 | 2/2005 | Ciotta |
| 6,886,017 B1 | 4/2005 | Jackson et al. |
| 6,970,869 B1 | 11/2005 | Slaughter et al. |
| 6,993,325 B1 | 1/2006 | Waesterlid |
| 7,058,036 B1 | 6/2006 | Yu et al. |
| 7,154,901 B2 | 12/2006 | Chava |
| 7,181,538 B2 | 2/2007 | Tam |
| 2001/0031641 A1 | 10/2001 | Ung et al. |
| 2001/0032267 A1 | 10/2001 | Collison |
| 2001/0034224 A1 | 10/2001 | McDowell et al. |
| 2001/0041579 A1 | 11/2001 | Smith et al. |
| 2002/0026513 A1 | 2/2002 | Hoglund et al. |
| 2002/0052968 A1 | 5/2002 | Bonefas et al. |
| 2002/0091775 A1 | 7/2002 | Morehead et al. |
| 2002/0112007 A1 | 8/2002 | Wood et al. |
| 2002/0133568 A1 | 9/2002 | Smith et al. |
| 2002/0174194 A1 | 11/2002 | Mooney et al. |
| 2003/0055912 A1 * | 3/2003 | Martin et al. ................ 709/218 |
| 2005/0078660 A1 | 4/2005 | Wood |
| 2005/0141522 A1 | 6/2005 | Kadar et al. |
| 2005/0186974 A1 | 8/2005 | Cai |
| 2006/0053197 A1 | 3/2006 | Yoshimura et al. |

* cited by examiner

WEB GATEWAY MULTI-CARRIER SUPPORT

BACKGROUND OF THE INVENTION

1. Field of the Invention

This invention relates generally to wireless carriers, Internet service providers (ISPs), and information content delivery services/providers. More particularly, it relates to gateways between a wireless network and the Internet for routing messages to wireless devices.

2. Background of Related Art

Short Message Service Centers (SMSCs) deliver short messages through wireless networks. Typically they operate on highly valuable server platforms that are protected deep within a wireless carrier's network, and communicate via specialized protocols.

FIG. 5 shows a conventional gateway providing Internet access to a wireless network through a short message service center (SMSC).

In particular, as shown in FIG. 5, a gateway 900 implemented in a wireless network translates HTTP protocol messages, and/or email messages from Internet clients to protocols recognized by an SMSC, such as SMPP. Each wireless carrier typically its own Internet gateway that is able to communicate with its own SMSC(s).

Conventional gateway 900 architecture provides a communication path between fixed protocol types, e.g., between HTTP protocol messages and SMPP protocol messages, based on known formats of destination Carriers. Separate gateway application programming interfaces (APIs) are developed to communicate with other protocol types, and those separate API's are conventionally 'hard-coded' into the gateway 900.

Carriers typically have no easy way to pass messages into other carrier's networks. Inter-carrier messages is typically accomplished through roaming agreements on their SS7 networks.

A more cost-effective mechanism for cross-carrier messaging support is to utilize a public TCP/IP network, such as the Internet. This multi-carrier support can be utilized either among carriers for inter-network messaging, or from a service bureau that wishes to provide a single point of entry for routing messages to multiple carriers. In order to route messages to multiple carriers, the originating server must understand how to deliver messages to each gateway for each carrier. Each Gateway will typically receive messages in different ways. Even if a common protocol is used, such as HTTP, the implementation is different for carriers.

For instance, to pass communications from devices in the wireless network 130 serviced by a first carrier to devices in another wireless network serviced by another carrier, the gateway 900 formats the messages in a way which is known to conform to the needs of the other carrier using the internet client 971.

Unfortunately, as any particular wireless carrier's resources change, software updates may be required in a transmitting gateway to conform to the format of the newly changed receiving carrier's gateway. This requires the sending gateways to undergo a tremendous amount of development work as a result of the addition of new network elements, particularly wireless network elements.

In conventional systems, custom delivery software must be written for every carrier to which a short message may be transmitted. Thus, if there are, e.g., one hundred (100) carriers accessible from a particular wireless network, then the gateway application code will necessarily include, e.g., one hundred (100) software modules, one for each carrier.

Of course, as time goes on, some new carriers may enter a wireless network, some existing carriers may change configurations, and still other carriers may leave a wireless network. Each of these events relating to any of the carriers requires new or updated source code (e.g., new java code) in the sending gateway relating to a change in the relevant class file. This results in additional effort and/or down time in the gateways of one or all gateways between wireless networks and the Internet to accommodate the changes and/or additions to adjust the relevant application program class files.

There is a need for a technique and architecture to provide a unified means for routing message destinations to the gateways of other wireless carriers.

SUMMARY OF THE INVENTION

In accordance with the principles of the present invention, a short message distribution center comprises an incoming message queue, a carrier format table, and a destination link. The carrier format table comprises information relating to a plurality of different carrier formats each relating to a destination gateway of a relevant destination carrier.

A method of abstracting destination carrier format from a wireless Internet gateway in accordance with yet another aspect of the present invention comprises receiving an incoming short message. Destination carrier information is retrieved from the incoming short message. Destination carrier format information is retrieved from a carrier format table based on a match to the retrieved destination carrier information.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Multi-Carrier support is a feature of a wireless Internet gateway (WIG) that allows the WIG to send messages to any number of 'peer' gateways on the Internet in a conveniently reconfigurable manner. In accordance with the principles of the present invention, the WIG includes a 'Message Distribution Center' (MDC), through which short messages can be routed to the gateways of other wireless carriers based on carrier formats stored in an abstracted carrier format table. The conventional technique of separate delivery modules written for each carrier is replaced by entries in a look-up table format, to provide a more easily adaptable wireless gateway.

Thus, in accordance with the principles of the present invention, occasional updates of the carrier format table need only be updated, rather than the wireless Internet gateway program, reducing down time for updates, reducing the complexity of updates, and improving the reliability of a wireless Internet gateway in the face of changes for one or more carriers in a wireless network.

A suitable wireless Internet gateway is disclosed in co-owned U.S. application Ser. No. 09/630,762, filed Aug. 2, 2000, entitled "Wireless Internet Gateway", now U.S. Pat. No. 7,228,333, to Richard Smith, the entirety of which is expressly incorporated herein by reference.

The present invention enables a WIG to communicate with the gateways of other carriers (particularly other wireless carriers) having different and occasionally changing kinds of message destinations using different and occasionally changing protocols.

In accordance with the principles of the present invention, information regarding other carriers (i.e., destinations) may be added, changed, and/or removed from a wireless short messaging system network by simply modifying a configuration property file relating to message formats for each other carrier, rather than the technique of providing each carrier with its own delivery module, avoiding the conventional need to reprogram relevant sending gateways.

Figure 1:
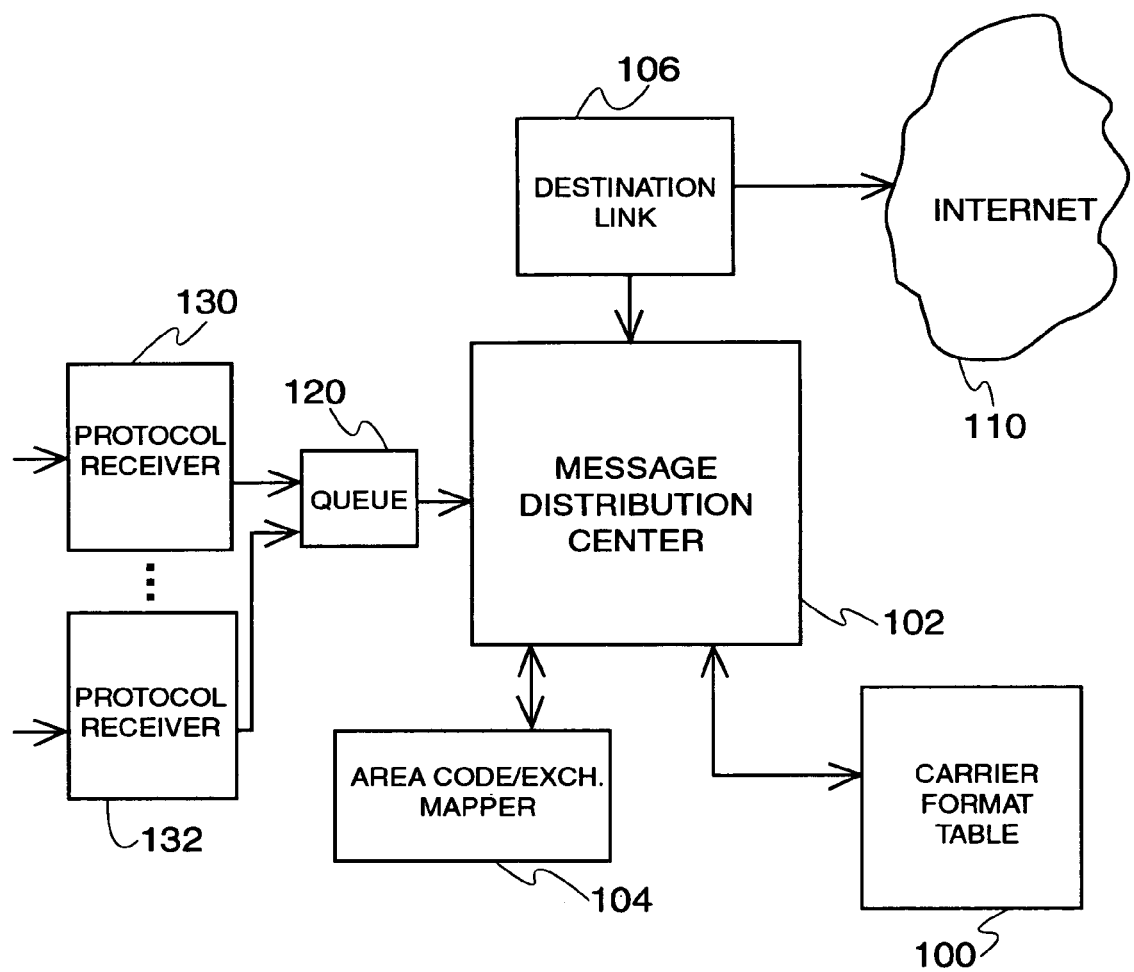
FIG. 1 shows an exemplary message distribution center in a wireless gateway including a carrier format table and destination link, in accordance with the principles of the present invention.

FIG. 1 shows an exemplary message distribution center in a wireless gateway including a carrier format table and destination link, in accordance with the principles of the present invention.

In particular, as shown in FIG. 1, short messages of various protocols are received by respective protocol receivers 130-132, and fed into a message queue 120. The various protocol receivers may relate, e.g., to email, HTTP, TAP, SMPP, etc. A message distribution center 102 portion of a wireless Internet gateway receives the queued short messages from the message queue 120, e.g., on a first come-first served basis.

The queued messages are interrogated by the message distribution center 102 to determine their destination carrier. One appropriate interrogation method is, e.g., in the case of a page or voice message, to map the area code and exchange number of the destination telephone number to a particular carrier. This is performed in the area code/exchange mapper 104, in communication with the message distribution center 102.

The WIG may determine the destination gateway by the area code and exchange of the destination device (NPA/NXX). For example, short messages to numbers beginning with 443994 are automatically routed to AT&T Wireless Services™. For devices with non-10 digit destination numbers (e.g., some pagers), standard numbers are prefixed to the actual destination in order to make it 10 digits.

In accordance with the principles of the present invention, once a carrier is determined from the short message, the preferred format and other carrier specific information is determined from a carrier format table 100. Then, given the carrier specific information obtained from the carrier format table 100, the messages are sent to a destination link 106 for transmission via the appropriate protocol to the appropriate destination via the Internet 110.

In the disclosed embodiments, the carrier format table 100 includes a carrier property configuration file or carrier format file, e.g., 'GWDEST.properties'. The GWDEST.properties file is used to define carriers in a wireless short messaging system, together with the particular properties that go along with each carrier.

While the present embodiment describes a carrier property file named GWDEST.properties, the carrier format table may have any name within the scope of the present invention. The GWDEST.properties file specifies the various settings that are necessary to support a particular carrier.

The internal queue 120 simply sends messages to a generic Interface, which can be implemented in any number of ways. The interface defines basic messaging requirements, such as 'sendTextMessage' and 'makeConnection'.

A WIG in accordance with the principles of the present invention is able to support multiple destinations (carriers) in an easily updatable fashion because the potential carrier destinations are internally abstracted away from their associated protocols. For the multi-carrier support feature in accordance with the principles of the present invention, the destination link interface 106 transparently routes short messages to other destination objects representing each possible peer gateway. Peer gateway objects are created from classes that capture the underlying protocol to use. For example, SMTP, HTTP Post and HTTP Get.

The carrier format table 100 configuration file preferably includes the universal resource locator (URL) and form field names, together with information regarding whether the carrier is communicated with, e.g., using HTTP GET, HTTP POST, or Email.

In the disclosed embodiment, carrier specific properties of all carriers in a network are entered into the carrier format table, e.g., into the GWDEST.properties file. The GWDEST.properties file may be updated on a periodic basis as necessary, without the need to affect other operations of the gateway.

The following is an example configuration file called GWDEST.properties, including destination information for seven (7) carriers. Of course, the principles of the present invention relate to a configuration file containing fewer or many, many more carrier entries, e.g., hundreds. Note that the number of entries for each carrier may change, depending upon the particular carrier.

numOfCarriers=7

0_className=tcs.ain.smsgw.gwdest.GWDestHttpGet

0_carrierName=AT

0_carrierNameLong=AirTouch

0_baseURL=http://webmsg.airtouch.com/cgi-bin/smspowerband_parse_genmail

0_maxLen=120

0_numFields=3

0_fieldNum0=min NUM

0_fieldNum1=callback from

0_fieldNum2=message MSG

1_className=tcs.ain.smsgw.gwdest.GWDestHttpGet

1_carrierName=AMT

1_carrierNameLong=Ameritech

1_baseURL=http://paging.acswireless.com/cgi-bin/page.cgi

1_maxLen=120

1_numFields=5

1_fieldNum0=miscVar template=paging

1_fieldNum1=miscVar email=httpd@ameritech.exmachina.comm

1_fieldNum2=min pin

1_fieldNum3=callback from

1_fieldNum4=message message

2_className=tcs.ain.smsgw.gwdest.GWDestHttpPost

2_carrierName=ATT

2_carrierNameLong=AT&T Wireless

2_baseURL=http://www.mobile.att.net/mc/mc_pagersend.cgi

2_maxLen=110

2_numFields=5

2_fieldNum0=miscVar htmlsource=nonMsg.html

2_fieldNum1=min pin

2_fieldNum2=miscVar returnpage=default

2_fieldNum3=callback from

2_fieldNum4=message message

3_className=tcs.ain.smsgw.gwdest.GWDestHttpGet

3_carrierName=BAM

3_carrierNameLong=Bell Atlantic Mobile

3_baseURL=http://www3.bam.com/cgi-bin/sms/sms.cgi

3_maxLen=120

3_numFields=5

3_fieldNum0=miscVar msg_type=messaging

3_fieldNum1=areaCode area_code

3_fieldNum2=exchange exchange

3_fieldNum3=extension extension

3_fieldNum4=message message

4_className=tcs.ain.smsgw.gwdest.GWDestHttpGet

4_carrierName=BS

4_carrierNameLong=BellSouth

4_baseURL=http://www.sms.bellsouth.com/sendnow.cgi

4_maxLen=155

4_numFields=2

4_fieldNum0=min min

4_fieldNum1=message msg

5_className=tcs.ain.smsgw.gwdest.GWDestEmail

5_carrierName=PB

5_carrierNameLong=PacBell

5_maxLen=110

5_baseURL=@pacbellpcs.net

5_appendDigits=1

6_className=tcs.ain.smsgw.gwdest.GWDestEmail

6_carrierName=OT

6_carrierNameLong=Omnipoint append a '1' to the number for the email address

6_appendDigits=1

6_baseURL=@omnipoint.net

6_maxLen=60

To show the flexibility of the GWDEST.properties file, and the carrier format table 100 in general, the following is an alternative entry for carrier No. 6:

This is the web page link for Omnipoint.

6_className=tcs.ain.smsgw.gwdest.GWDestHttpGet

6_carrierName=OT

6_carrierNameLong=OmniPoint

6_baseURL=http://www.omnipoint.com/cgi-bin/message.cgi

6_appendDigits=1

6_maxLen=60

6_numFields=2

6_fieldNum0=min phone

6_fieldNum1=message message

Each carrier entry in the exemplary configuration file 100 may start with the carrier's ID number as set in an appropriate database.

The ClassName currently takes one of three forms, although additional forms may be possible. The ClassName relates to the method of communication to the relevant carrier.

In the disclosed embodiment, a ClassName of GWDestHttpGet indicates that the carrier communicates with an HTTP GET command, and handles carriers that use HTTP GET. A ClassName of GWDestHttpPost indicates that the carrier communicates with an HTTP POST command, and handled carriers that use HTTP POST. A ClassName of GWDestEmail indicates that the carrier communicates via Email, and handles carriers that use email.

The CarrierName parameter may be 2 or 3 letter code unique to the particular carrier.

The CarrierNameLong parameter may be the full proper name of the particular carrier.

The MaxLen parameter may be used to indicate the maximum length of the short message which may be supported by the relevant carrier.

The BaseURL parameter may be the address used for messaging with the particular carrier.

The numFields parameter is the number of form fields that the carrier's messaging page has.

The format for the fieldNumX properties may be as follows:

X_fieldNumY=ourVariableName theirVariableName, where ourVariableName can be any of the following types: min, callback, subject, message, priority, areaCode, exchange, extension, phoneNumber, and miscVar. These represent fields that are recognized by the local sending gateway.

As disclosed, the carrier's variables are mapped into the variables of the carrier to which the message is sent. The sub-parameter miscVar may be used for any variable that does not have a dynamically assigned value. When the URL is generated, it is spit out as is.

Figure 2:
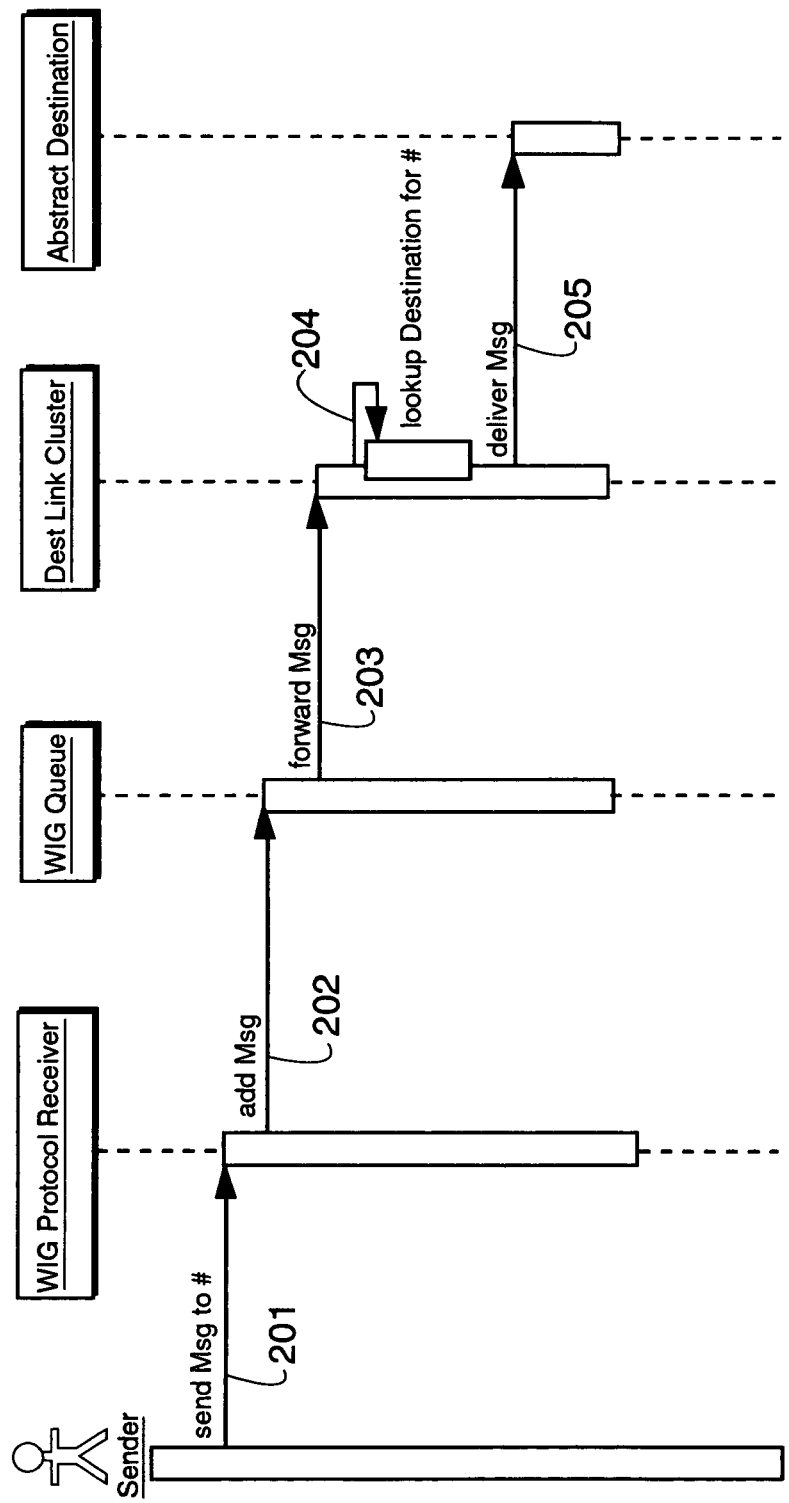
FIG. 2 shows an exemplary overview of message flow relating to the message distribution center shown in FIG. 1.

FIG. 2 shows an exemplary overview of message flow relating to the message distribution center shown in FIG. 1.

In particular, as shown in FIG. 2, a message is sent by the sender to one of the protocol receivers 130-132, as shown in message 201.

The relevant protocol receiver 130-132 adds the message to the queue 120, as shown in message 202.

In message 203, the message is forwarded by the queue 120 to the message distribution center module 102.

The message distribution center 102 interrogates the message to determine the intended destination, and looks up the particular destination from an appropriate database, e.g., the area code/exchange mapper 104, as depicted in message 204.

In message 205, the message distribution center 102 delivers the message to the destination, as an abstracted destination link 106, for delivery to the relevant destination. The exemplary system uses an Object-Oriented, interface-driven approach to accomplish abstraction from particular carrier protocols, such as SMTP and HTTP Get.

The present invention focuses on the use of a carrier format table 100 by the destination link 106 to obtain the appropriate format for the destination carrier. In particular, "multi-carrier support" relates to the definition and use of special classes in the "Abstract Destination" (IGWSNLink) that know how to deliver messages to various "Peer" wireless internet gateways using, e.g., SMTP, HTTP, or other (even future) protocols.

Figure 3:
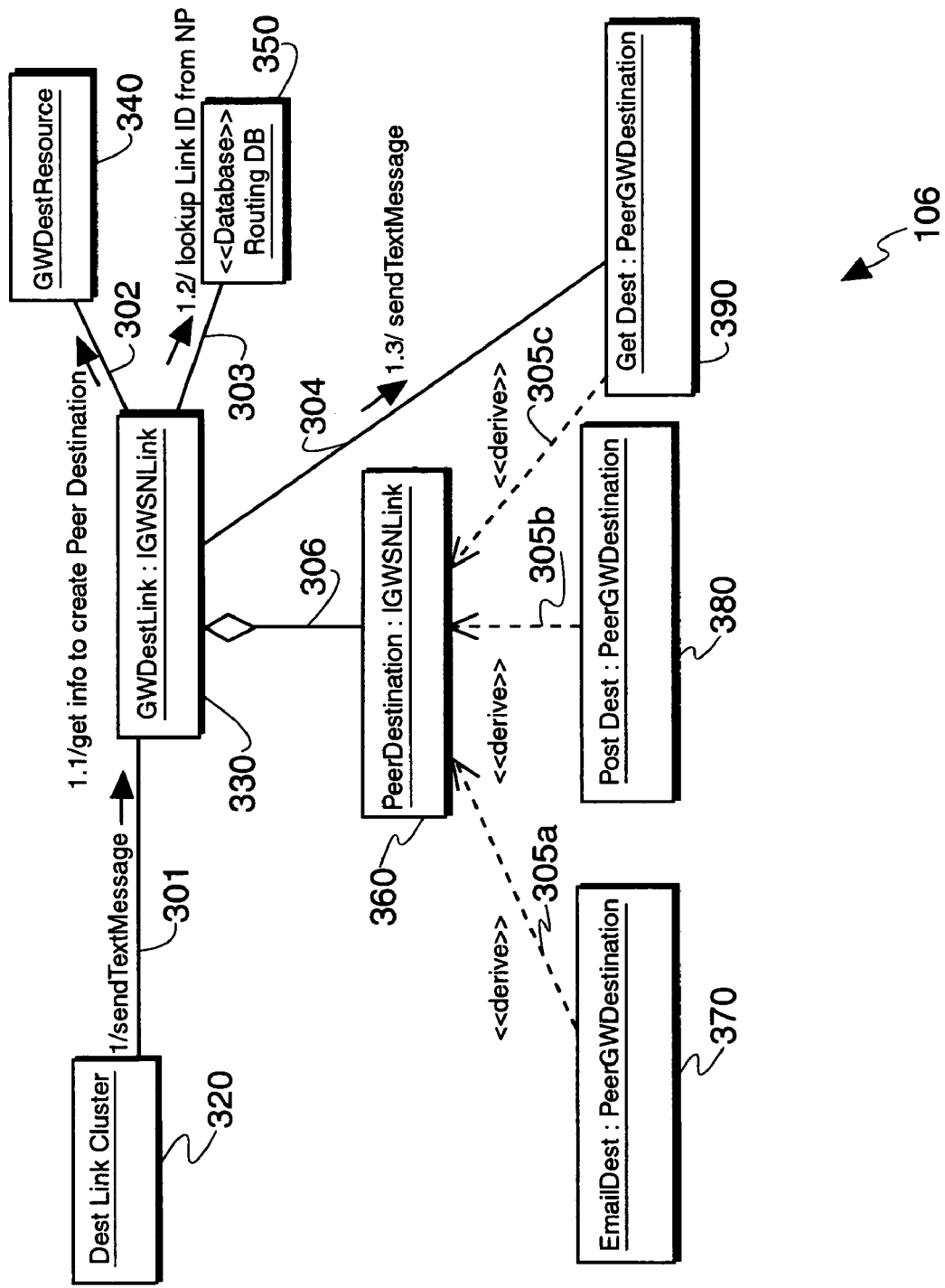
FIG. 3 shows an exemplary destination link and related modules of a wireless gateway such as that shown in FIG. 1.

FIG. 3 shows an exemplary destination link 106 and related modules of a wireless Internet gateway such as that shown in FIG. 1.

The destination link 106 includes a destination link cluster module 320, a Gateway destination link module called GWDestLink:IGWSNLink 330, a GWDestResource 340, and a Routing Database 350. The destination link 106 also includes peer modules, including a PeerDestination:IGWSNLink 360 which utilizes an appropriate format module, e.g., Email Dest:PeerGWDestination module 370 which communicates via email, Post Dest:PeerGWDestination module 380 which communicates via POST commands, and Get Dest:PeerGWDestination module 390 which communicates via GET commands.

As shown in FIG. 3, a message may be sent to the destination link GWDestLink 106. The message is sent using, e.g., a sendTextMessage 301, to the GWDestLink 330.

The GWDestLink 330 aggregates many peer destinations. For instance, the GWDestLink 330 gets information from a GWDestResource 340, to create a peer destination, as shown in message 302. The GWDestResource 340 may be used to dynamically create peer destinations and to assign attributes such as which servers to communicate with, the format to use to communicate, etc.

Figure 4A:
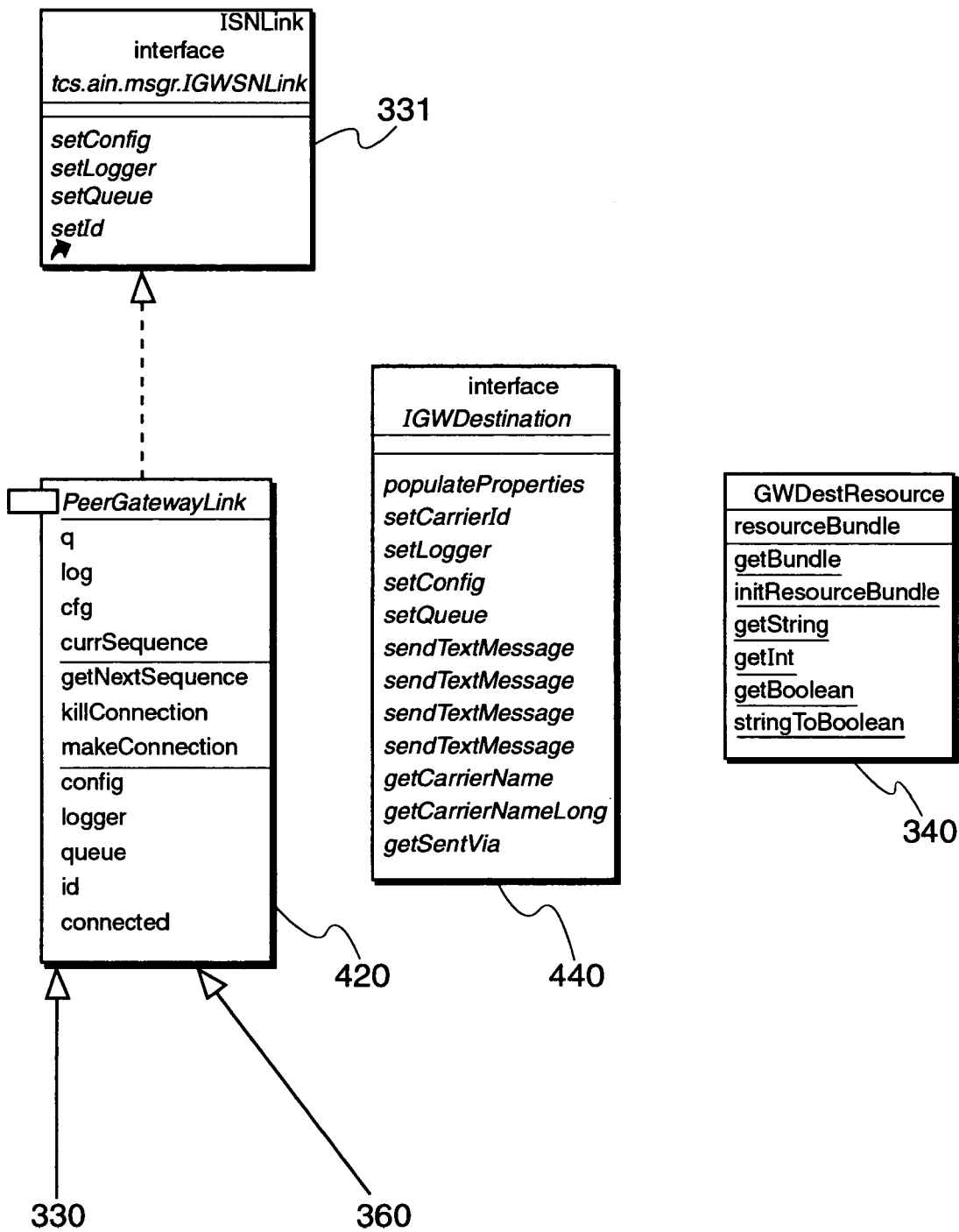
FIG. 4 shows an exemplary implementation of the destination link and related modules shown in FIG. 3.
Figure 4B:
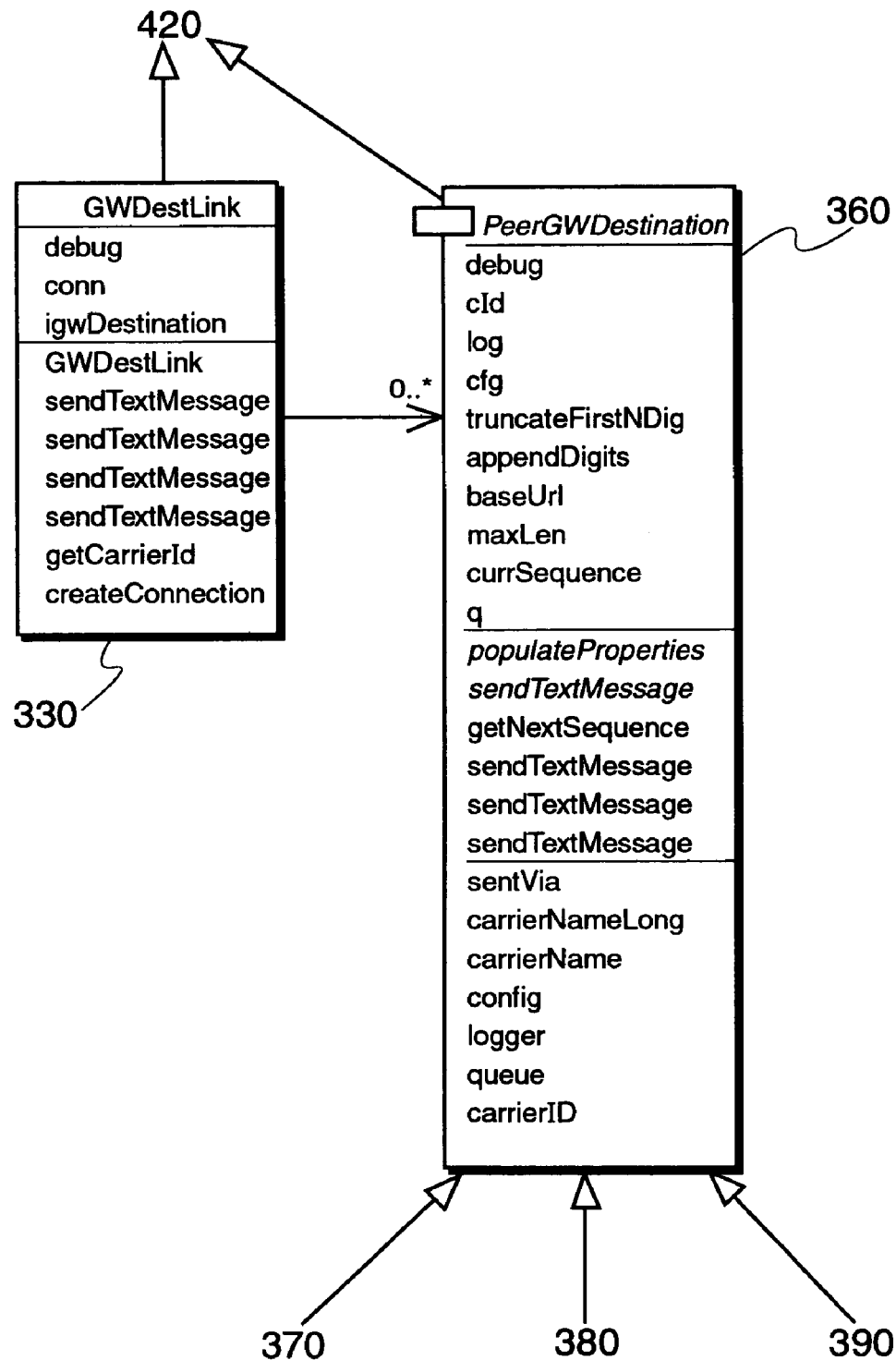
Figure 4C:
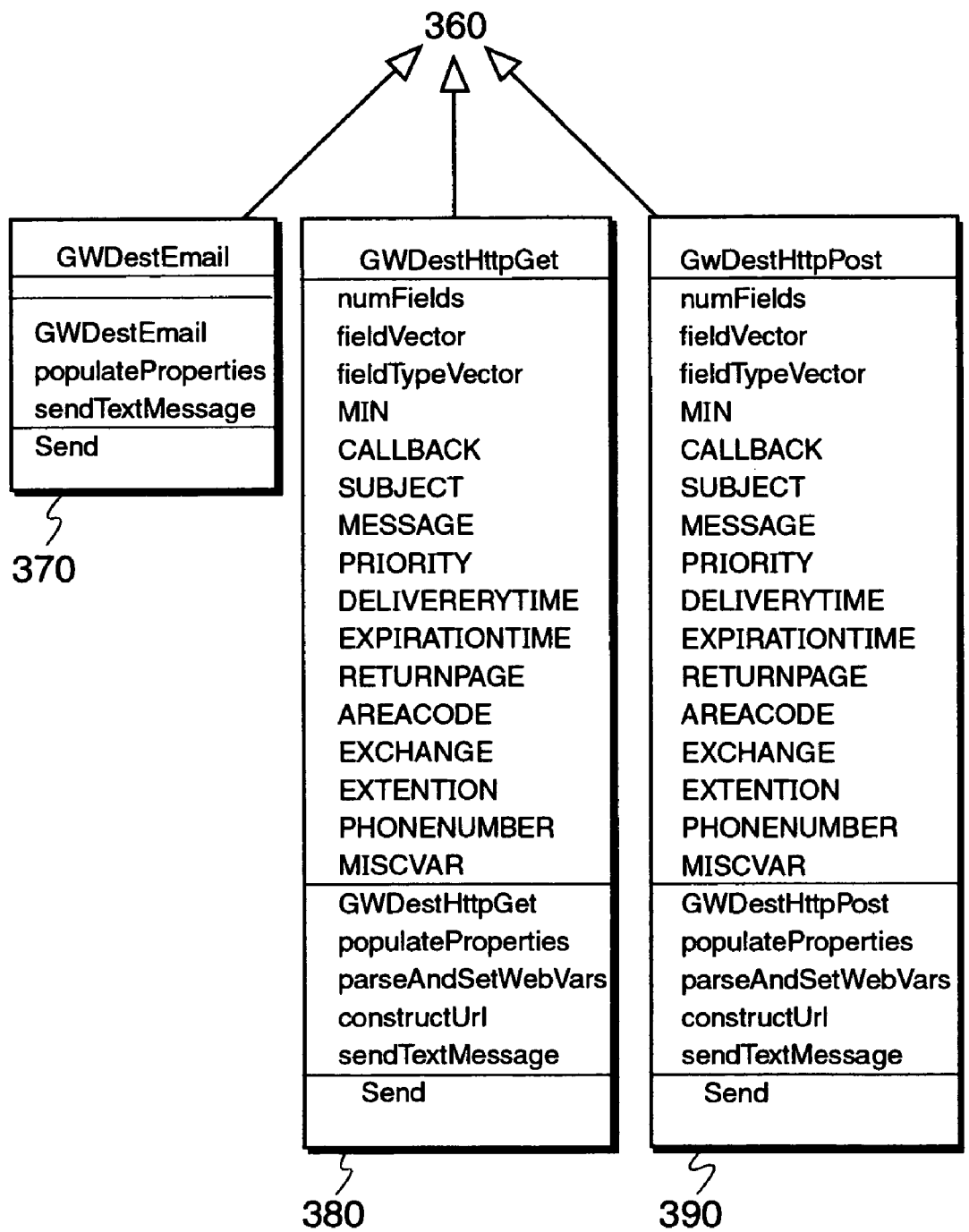
Figure 5:
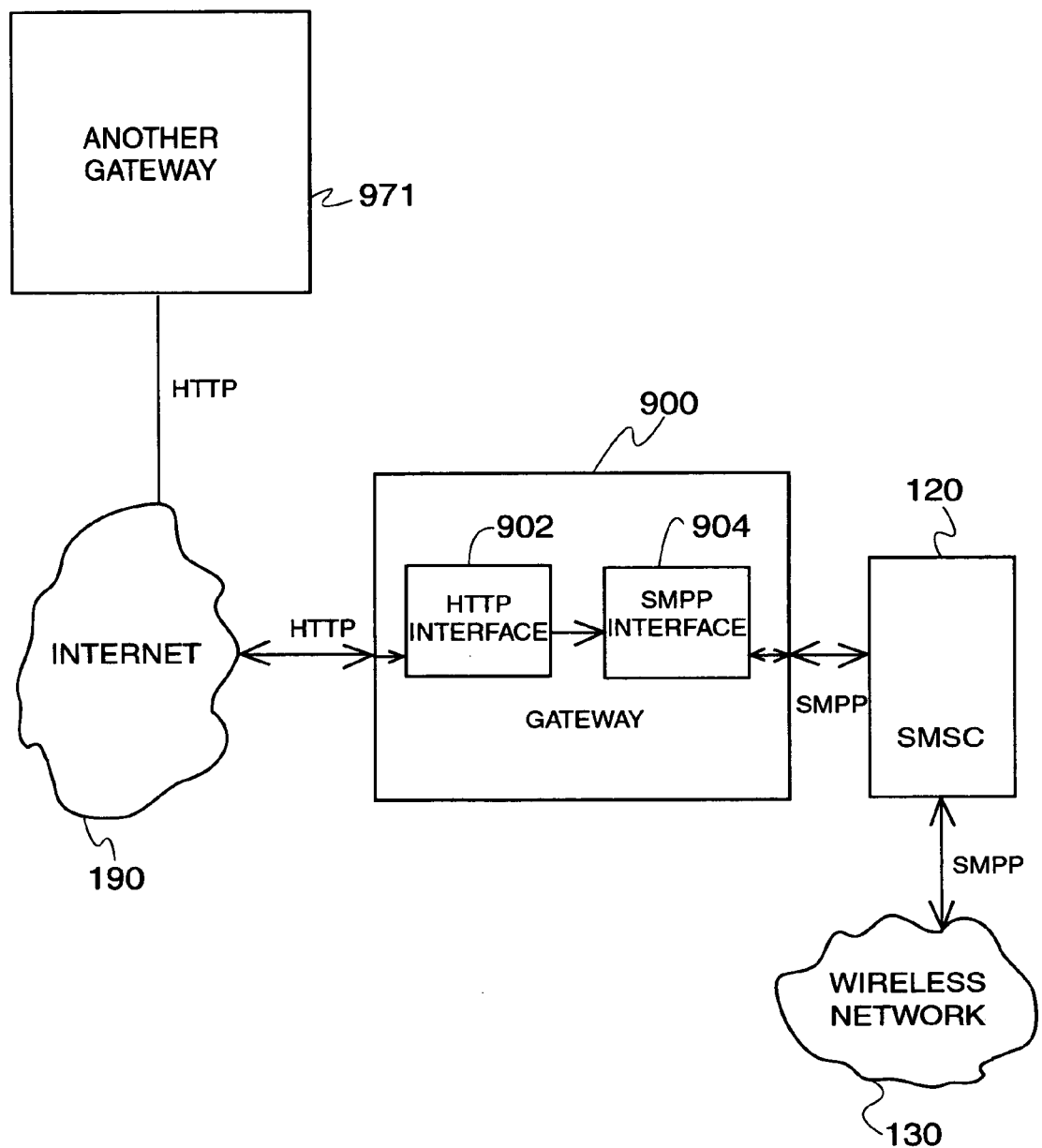
FIG. 5 shows a conventional gateway providing Internet access to a wireless network through a short message service center (SMSC).

As shown in message 304, the GWDestLink 330 forwards the message to the appropriate peer destination which is to handle transmission of the message to another gateway over the Internet 110 using the appropriate protocol, e.g., Email, HPPT post, etc. Labels 305 indicate that the peer GW Destinations a sub-types of the PeerDestination class and the IGWSNLink interface. FIG. 4 shows an exemplary implementation of the destination link and related modules shown in FIG. 3.

The enabling WIG technology disclosed here allows short messages (e.g., email, voice mail, HTTP post, etc.) to be transparently routed to the appropriate destination gateway using a configurable carrier format table. It also allows the message length to be formulated to reflect the destination, e.g., a 400-character message can be sent in whole to a Bell South IPS pager, whereas the same message would be split into 4 separate 100 characters messages when sent to a Sprint Phone.

While the invention has been described with reference to the exemplary embodiments thereof, those skilled in the art will be able to make various modifications to the described embodiments of the invention without departing from the true spirit and scope of the invention.

What is claimed is:

1. A message distribution center, comprising:
    a plurality of protocol receivers to receive messages from users of at least one carrier destined for routing via an Internet to a different, destination carrier having a different format;
    an incoming message queue to queue said received messages;
    a dynamically updateable carrier message format table comprising carrier specific format information for each possible different destination carrier; and
    a destination link interface to transparently route said received and queued messages to external remote destination carrier gateways representing each possible peer gateway, said destination carrier gateways being selected for each said received message based on carrier specific information obtained from said dynamically updateable carrier message format table;
    wherein said dynamically updateable carrier message format table is adapted to be dynamically updated to include an up-to-date list of possible destination carrier gateways.

2. The message distribution center according to claim 1, wherein said plurality of protocol receivers comprise:
    an email message receiver.

3. The message distribution center according to claim 1, wherein said plurality of protocol receivers comprise:
    an HTTP protocol message receiver.

4. The message distribution center according to claim 1, wherein said plurality of protocol receivers comprise:
    an SMPP protocol message receiver.

5. The message distribution center according to claim 1, further comprising:
    an area code/exchange number to destination carrier mapper to map an area code/exchange number of a message received in said incoming message queue to a destination carrier's gateway format.

6. The message distribution center according to claim 1, wherein said destination link further comprises:
    an interface to an Internet.

7. A method of abstracting destination carrier format from a wireless Internet gateway, comprising:
    receiving an incoming short message from a user of a first carrier;
    retrieving destination carrier information from said incoming short message;
    retrieving destination carrier message format information from a dynamically updateable carrier message format table comprising carrier specific format information for each possible different destination carrier; and
    routing said received short message to an external remote destination carrier gateway selected based on carrier specific information obtained from said dynamically updateable carrier message format table;
    wherein said dynamically updateable carrier message format table is adapted to be dynamically updated to include an up-to-date list of possible destination carrier gateways.

8. The method of abstracting destination carrier format from a wireless Internet gateway according to claim 7, further comprising:
    generating a peer destination class based on said carrier specific information retrieved from said dynamically updateable carrier message format table.

9. The message distribution center according to claim 1, wherein said dynamically updateable carrier message format table comprises:

a universal resource locator (URL) of a relevant destination carrier;
form field information; and
a communication protocol of said relevant destination carrier.

10. Apparatus for abstracting destination carrier format from a wireless Internet gateway, comprising:
means for receiving an incoming short message from a user of a first carrier;
means for retrieving destination carrier information from said incoming short message;
means for retrieving destination carrier message format information from a dynamically updateable carrier message format table comprising carrier specific format information for each possible different destination carrier; and
means for routing said received short message to an external remote destination carrier gateway selected based on carrier specific information obtained from said dynamically updateable carrier message format table;
wherein said dynamically updateable carrier message format table is adapted to be dynamically updated to include an up-to-date list of possible destination carrier gateways.

11. The apparatus for abstracting destination carrier format from a wireless Internet gateway according to claim 10, further comprising:
means for generating a peer destination class based on said carrier specific information retrieved from said dynamically updateable carrier message format table.

* * * * *